(12) United States Patent
Ladabaum

(10) Patent No.: US 6,571,445 B2
(45) Date of Patent: Jun. 3, 2003

(54) METHOD FOR MAKING ACOUSTIC TRANSDUCER

(76) Inventor: Igal Ladabaum, 121 Baytree Rd., San Carlos, CA (US) 94070

( * ) Notice: Subject to any disclaimer, the term of this patent is extended or adjusted under 35 U.S.C. 154(b) by 0 days.

(21) Appl. No.: 09/898,035

(22) Filed: Jul. 3, 2001

(65) Prior Publication Data

US 2001/0043028 A1 Nov. 22, 2001

Related U.S. Application Data

(62) Division of application No. 09/315,896, filed on May 20, 1999, now Pat. No. 6,271,620.

(51) Int. Cl.⁷ ............................................. H04R 17/00
(52) U.S. Cl. .......................... 29/25.35; 29/594; 29/595; 29/609.1; 29/847; 310/334; 310/369; 381/173
(58) Field of Search ................... 29/25.35, 594, 29/595, 609.1, 846, 847, 852; 310/334, 365, 369; 216/57, 77, 78, 100, 102, 103, 105, 99; 381/173, 174, 178; 438/21, 48; 427/565, 579

(56) References Cited

U.S. PATENT DOCUMENTS

| | | | |
|---|---|---|---|
| 5,573,679 A | * 11/1996 | Mitchell et al. | 216/2 |
| 5,619,476 A | 4/1997 | Haller et al. | 367/181 |
| 5,870,351 A | 2/1999 | Ladabaum et al. | 367/163 |
| 5,982,709 A | * 11/1999 | Ladabaum et al. | 367/170 |
| 6,110,791 A | * 8/2000 | Kalnitsky et al. | 438/379 |
| 6,243,747 B1 | * 6/2001 | Tai et al. | 29/594 |

FOREIGN PATENT DOCUMENTS

| | | |
|---|---|---|
| DE | 24444023 | 3/1975 |
| JP | 01004199 | 1/1989 |
| JP | 01312486 | 12/1989 |
| JP | 02117299 | 5/1990 |

OTHER PUBLICATIONS

Bozkurt, et al., "Theory and Analysis of Electrode Size Optimization for Capacitive Microfabricated Ultrasonic Transudcers", IEEE Transactions on Ultrasonics, Ferrolectrics and Frequency Control, vol. 46, No. 6, Nov. 1999, pp. 1–11.

Ladabaum, et al., "Surface Micromachined Capacitive Ultrasonic Transducers", IEEE Ultrasonics, Ferrolectrics and Frequency Control, vol. 45, No. 3, May 1998, pp. 678–690.

(List continued on next page.)

*Primary Examiner*—Peter Vo
*Assistant Examiner*—Donghai D Nguyen
(74) *Attorney, Agent, or Firm*—Pillsbury Winthrop LLP

(57) ABSTRACT

The present invention provides an transducer and a method of making the same. The transducer is comprised of a plurality of transducer cells, and conductive interconnects between the cells. Each transducer cell contains a bottom electrode formed on a layer of insulator material, a lower insulating film portion formed over the bottom electrode, a middle insulating film portion that includes an air/vacuum void region, and an upper insulating film portion that includes a top electrode formed within a portion of the upper insulating film portion. A first layer of interconnects electrically connect the bottom electrodes of each transducer cell and a second layer of interconnects electrically connect the top electrodes of each transducer cell. The top and bottom layers of interconnects are patterned to avoid overlap between them, thus reducing the parasitic capacitance. Further, as noted, the top electrode is preferably formed within the upper insulating film portion, closer to the air/vacuum void than to the top surface of the insulating film, to increase the electric field for a given voltage. Still furthermore, the electrodes within each transducer cell are preferably formed to have dimensions that are smaller than the overall surface area of the membrane that they excite.

13 Claims, 16 Drawing Sheets

OTHER PUBLICATIONS

Ladabaum, et al., "Miniature Drumheads: Microfabricated Ultrasonic Transducers", Ultrasonics, vol. 36, 1998, pp. 25–29.

Ladabaum, et al., "Micromachined Ultrasonic Transducers: 11.4 MHz Transmission in Air and More", Applied Physics Letters, vol. 68, No. 1, Jan. 1996, pp. 7–9.

Jin et al., "The Microfabrication of Capacitive Ustrasonic Transducers", JMEMS, vol. 7, No. 3, Sep. 1998, pp. 295–302.

Spoliansky et al., "Micromachined Ultrasonic Air Transducers (MUT's)", Microelectronic Engineering, vol. 30, 1996, pp. 535–538.

Soh, et al., "Silicon Micromachined Ultrasonic Immersion Transducers", Applied Physics Letters, vol. 69, No. 24, Dec 1996, pp. 3674–3677.

Prak, et al., "Selective Mode Excitation and Detection of Micromachined Resonators", Micro Electro Mechanical Systems Workshop (Travemunde, Germany), IEEE Robotics and Automation Society, 1992, pp. 220–255.

Voorthuyzen, et al., "Optimization of Capacitive Microphone and Pressure Sensor Performance by Capacitor–Electrode Shaping", Sensors and Actuators A (Physical), vol. 25–27, 1991, pp. 331–336.

Kenichiro Suzuki et al.: "A silicon Electostatic Ultrasonic Transducer," IEEE Transactions on Ultrasonics, Ferroelectrics and Frequency Control, US, IEEE Inc., New York, vol. 36, No. 6, pp. 620–627.

* cited by examiner

METHOD FOR MAKING ACOUSTIC TRANSDUCER

This is a division of application Ser. No. 09/315,896, filed May 20, 1999 now U.S. Pat. No. 6,271,620.

BACKGROUND OF THE INVENTION

I. Field of the Invention

The present invention relates to the field of acoustic transducers. More specifically, the present invention relates to a novel electrostatic ultrasonic transducer capable of operating in high frequency ranges, and novel methods of fabricating such a transducer.

II. Description of the Related Art

An acoustic transducer is an electronic device used to emit and receive sound waves. An ultrasonic transducer is a type of acoustic transducer that operates at a frequency range beyond that of human perception, about 20 KHz. Acoustic transducers are used in medical imaging, non-destructive evaluation, and other applications. The most common forms of acoustic transducers are piezoelectric transducers, which operate in low and narrow band frequencies. Piezoelectric transducers are not efficient in the conversion between electric and acoustic energy in air. Furthermore, the operating frequencies of piezoelectric transducers in air are quite low.

Air coupled ultrasonic transducers with higher operating frequencies, which rely on certain microfabrication techniques, are described by Haller et al. in U.S. Pat. No. 5,619,476 entitled "Electrostatic Ultrasonic Transducer," issued Apr. 9, 1997, and Ladabaum et al. in U.S. Pat. No. 5,870,351 entitled "Broadband Microfabricated Ultrasonic Transducer and Method of Fabrication," issued Feb. 9, 1999. Published material known in the art also demonstrates that immersion transducers can be made with similar techniques. Air-coupled transducers are usually resonant, while liquid-coupled transducers are typically not. As shown in FIGS. 1A and 1B taken from the '476 patent, the transducer disclosed therein is made of a substrate 11 and a gold contact layer 14 that forms one one plate of a capacitor, and a membrane including a nitride layer 13 and a gold contact layer 14B that form the other plate of the capacitor (while the gold contact layer 14 is the electrode, with the nitride layer 13 being an insulator, the reference to electrode 13/14 will be used so as to distinguish the other electrode 11/14 that has a gold contact layer 14 adjacent the conductive substrate 11 as illustrated in the above-mentioned patents). Holes 16 etched in the nitride layer 13 and the gold layer 14 are used to etch away portions of the sacrificial oxide layer 12, while remaining posts of the sacrificial layer 12 support the membrane. By noting the change in capacitance between the two electrodes 13/14 and 11/14, the ultrasonic resonance of the membrane can be detected.

Such microfabricated ultrasonic transducers use resilient membranes that have very little inertia. The momentum carried by approximately half of a wavelength of air molecules is able to set the membrane in motion and visa versa. Electrostatic actuation and detection enable the realization and control of such resonant membranes. When distances are small, electrostatic attractions can exert very large forces on the actuators of interest.

Microfabricated ultrasonic transducers of this design have practical problems that prohibit their use at high frequencies, typically above about 10 MHz, and that reduce their efficiency at any frequency range. It has been realized by the present inventor that there are various reasons that prohibit the use of microfabricated ultrasonic transducers. One reason is that the electrodes 13/14 and 11/14 are each formed as a conductive sheet. As illustrated in FIG. 1A, while the gold contact layer 14 covers the voids where the sacrificial layer 12 has been etched away, the gold contact layer 14 also entirely covers the posts which support the membrane. Similarly, the substrate 11 and the gold contact layer 14 associated therewith is another conductive sheet. Accordingly, at areas other than where sacrificial etch access holes 15 exist, there is no area where the electrodes 13/14 and 11/14 do not overlap. This overlap causes a parasitic capacitance, which is exacerbated due to the fact that the dielectric constant of the semiconductor insulators between the areas of the sacrificial layer 12 posts can be approximately one order of magnitude larger than that of the air/vacuum gap at the center of the membrane. As frequencies become higher, the parasitic capacitance becomes significant and sometimes even a dominant factor in transducer performance. Thus, even if the overlap at the areas of the sacrificial layer 12 posts accounts for only 1/10 of the active area of the transducer, such overlap may account for half the capacitance.

Furthermore, the spacing between the top electrode 13/14 and the bottom electrode 11/14 is a further reason that the parasitic capacitance increases. In particular, the membrane has a thickness that, due to physical constraints, needs to be at least about 2,500 Angstroms thick. Thus, when the gold contact layer 14 is placed over the nitride layer 13, there is additional parasitic capacitance due to the thickness of the nitride layer.

As a result of the above-mentioned parasitic capacitances, transducers such as those described in Haller et al or Ladabaum et al are not able to operate at higher frequencies, and operate less efficiently than ultimately possible at lower frequencies. Accordingly, there is the need for an improved acoustic transducer.

SUMMARY OF THE INVENTION

It is an object of the present invention to provide an ultrasonic transducer capable of operating at higher frequencies.

It is a further object of the present invention to provide an ultrasonic transducer capable of operating more efficiently than previously known ultrasonic transducers.

It is a further object of the present invention to provide an ultrasonic transducer that has reduced parasitic capacitance between the electrodes used to alternatively detect and excite the sound wave.

It is a further object of the present invention to form a transducer of a plurality of transducer cells that have an interconnect structure that reduces parasitic capacitance.

It is a further object of the present invention to provide a method for fabricating an ultrasonic transducer that has the above-mentioned characteristics.

The present invention achieves the above objects, among others, with an ultrasonic transducer comprised of a plurality of transducer cells, and conductive interconnects between the cells. Each transducer cell contains a bottom electrode formed on a layer of insulator material, a lower insulating film portion formed over the bottom electrode, a middle insulating film portion that includes an air/vacuum void region, and an upper insulating film portion that includes a top electrode formed within a portion of the upper insulating film portion. A first layer of interconnects electrically connect the bottom electrodes of each transducer cell and a second layer of interconnects electrically connect the top electrodes of each transducer cell. The top and bottom layers of interconnects are patterned to avoid overlap between them, thus reducing the parasitic capacitance.

Further, as noted, the top electrode is preferably formed within the upper insulating film portion, closer to the air/vacuum void than to the top surface of the insulating film, to increase the electric field for a given voltage.

Still furthermore, the electrodes within each transducer cell are preferably formed to have dimensions that are smaller than the overall surface area of the insulating film that they excite.

A method of fabricating the ultrasonic transducer according to the present invention is initiated by depositing and forming a pattern of the bottom electrode and interconnects. Thereafter, the lower insulating film portion of insulator material is deposited. A sacrificial layer is then deposited over the lower insulating film portion and etched to a desired pattern. The middle insulating film portion of insulator material is deposited over the sacrificial layer pattern, followed by the depositing and forming of the top layer of electrode and interconnects. Thereafter, an upper insulating film portion of insulator material is deposited to complete the formation of the insulating film. Thereafter, the insulating film is etched to form a via hole that allows an etchant to reach the sacrificial layer pattern. Etching is then performed to remove the remaining sacrificial layer pattern to form void areas. Sometimes such via holes and etching is introduced after the middle insulating film portion is deposited and before the top layer of electrode and interconnects is deposited.

As noted above, the top layer of electrode and interconnects is formed so that the top layer interconnects do not overlap the bottom layer interconnects, thus reducing the parasitic capacitance.

In a further embodiment of the invention, the ultrasonic transducer is comprised of a number of interconnected transducer cells. The transducer cells are electrically connected together to form a single ultrasonic transducer. Multiple transducers can be formed on the same substrate in an array. The ultrasonic transducers, and each of the transducer cells formed therein, are formed at the same time using the fabrication steps described above.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1A:
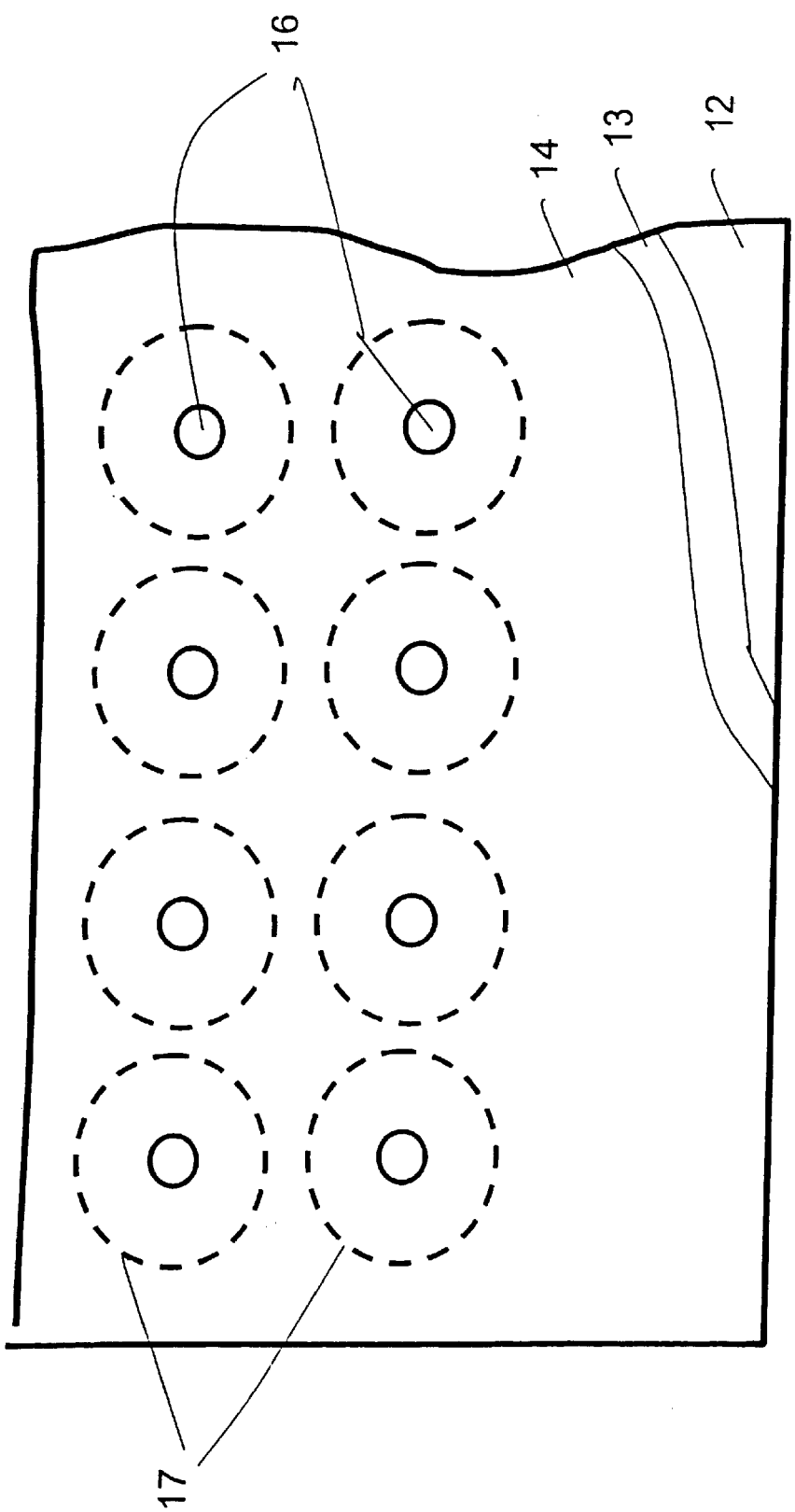
FIGS. 1A and 1B illustrate a top-view and a cross-section of an electrostatic transducer as is known in the prior art.
Figure 1B:
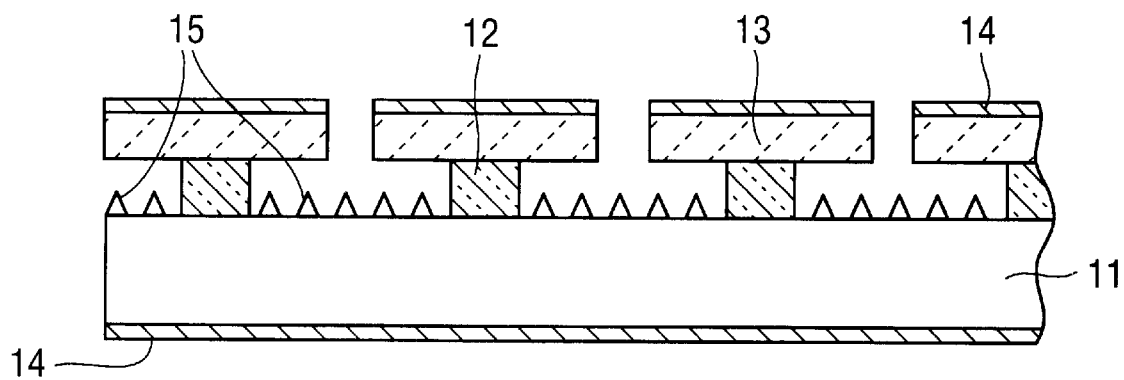
Figure 2:
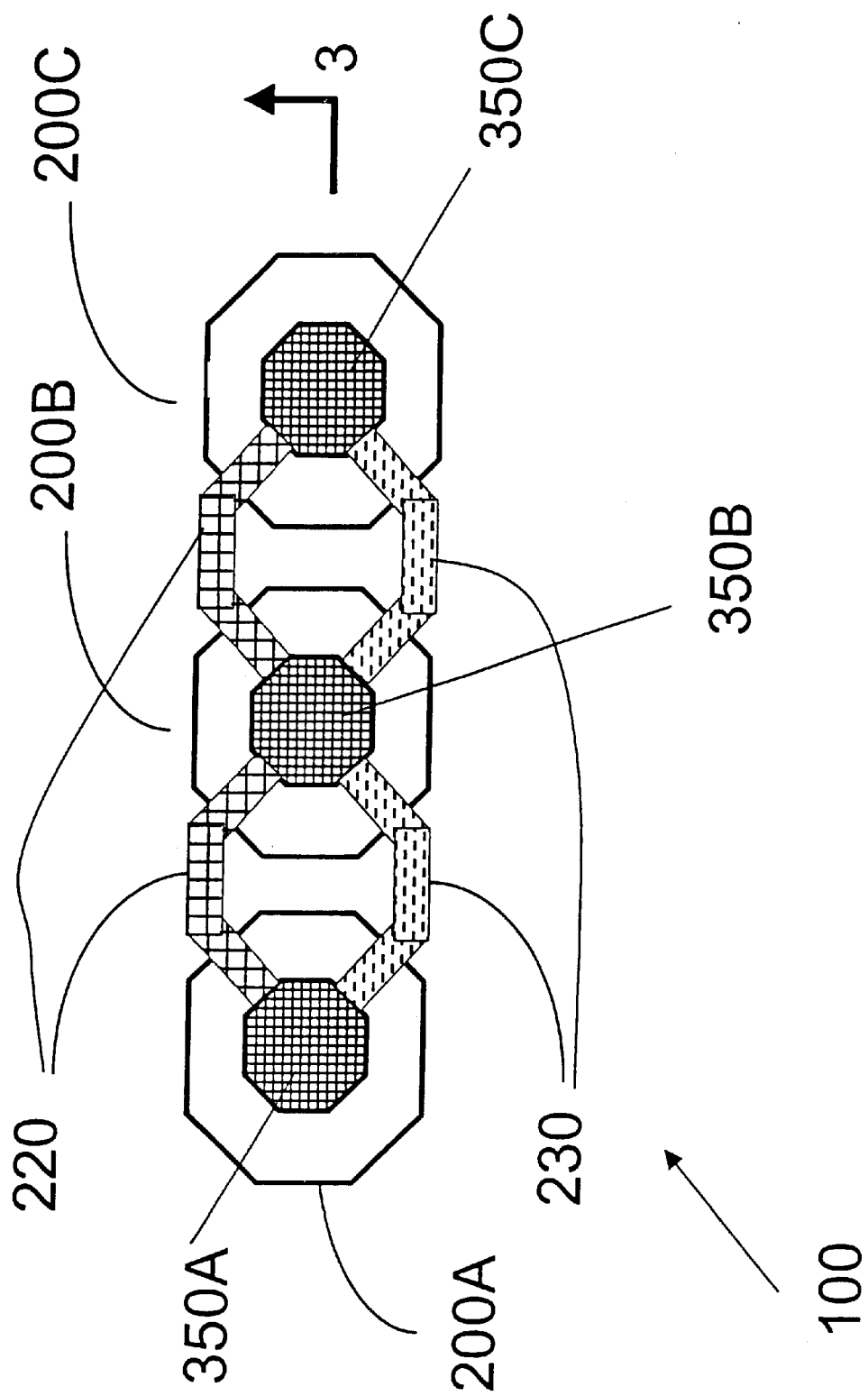
FIG. 2 is a top-view of an electrostatic transducer according to a preferred embodiment of the present invention.

A preferred embodiment of the present invention will first be described with respect to FIGS. 2–3. FIG. 2 illustrates a top-view diagram illustrating certain aspects of the present invention. As illustrated, a transducer 100 is illustrated as including three connected octagonal-shaped transducer cells 200A–C are shown. Of course the transducer 100 may have as few as one or many more than three, such as hundreds or thousands, transducer cells 200 associated with it. Many such transducers 100 will typically be formed at the same time on a wafer, with the wafer cut into different die as is known in the art. The discussions hereinafter, however, will be made with respect to a single transducer 100.

The octagonal shape of the transducer cells 200 illustrated in FIG. 2 is for illustrative purposes, and it is understood that the shape of the transducer cell can be a variety of different shapes, such as hexagonal, round, square, rectangular, triangular, or any other suitable configuration. In addition, transducer cells 200 may be of different sizes to provide broadband frequency response. Transducer cells 200 may also be of certain shapes, such as rectangular, so that they may resonate at a plurality of frequencies. Any number of transducer cells 200 can be interconnected, as described in further detail hereinafter, to form a single transducer.

One aspect of the present invention illustrated in FIG. 2 is the usage of top and bottom interconnects 220 and 230 that are used to electrically connect top and bottom electrodes, respectively, of adjacent transducer cells 200. Rather than a sheet of conductor forming both the electrode and the "interconnect" as in the prior art, the present invention forms transducer cells which each have their own top and bottom electrodes, and then interconnects having dimensions smaller than the entire sheet of conductor are used to electrically connect different electrodes. While the top and bottom electrodes of the various cell transducers can be electrically viewed as being single top and bottom electrodes, the discussion hereinafter will use the top and bottom electrodes to refer to the electrodes associated with a single transducer cell.

Preferably, according to the present invention, when viewed from a top view, the interconnects 220 and 230 also do not overlap with each other. As used herein, the term "overlap" with respect to the interconnects will be used in this manner. Accordingly, a multi-membrane transducer is formed by interconnecting transducer cells 200A–C on a substrate 300. The transducer cells 200 may be of the same size, as shown, or be of different sizes. In such a transducer, each transducer cell 200 is electrically connected to other transducer cells 200, such that each transducer cell 200 has a top electrode 350 linked by a top layer interconnect 220, as illustrated in FIG. 2. Each bottom electrode 320 (not shown in FIG. 2) is connected by a bottom layer interconnect 230. Accordingly, overlap of the interconnect 220 and 230 is avoided. Thus, even thought the dielectric constant of semiconductor insulators, such as nitride, can be approximately one order of magnitude larger than that of the air/vacuum, by eliminating, or at least minimizing, overlap of the electrode interconnects, parasitic capacitance is reduced.

Figure 3:
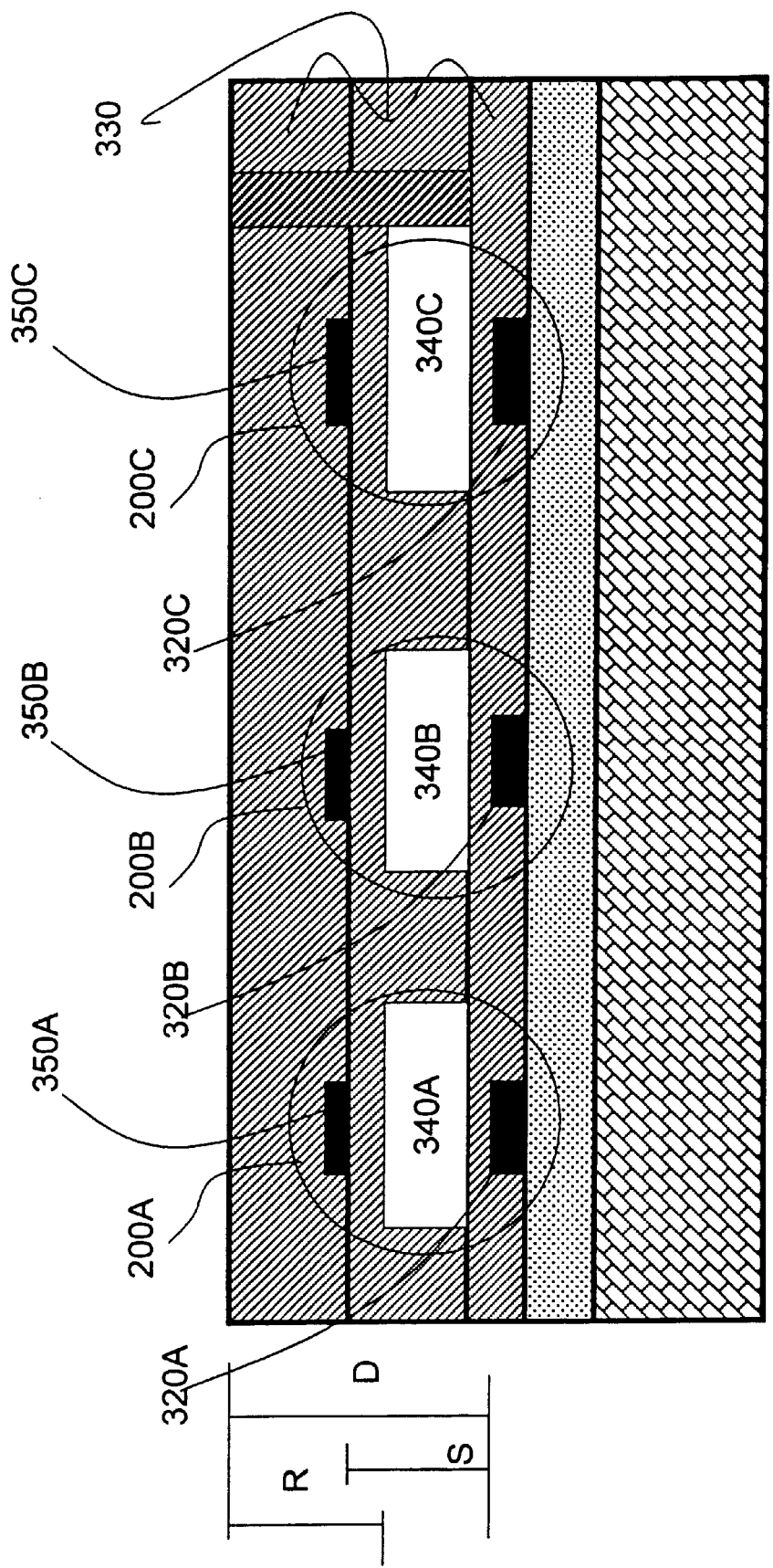
FIG. 3 is a cross-sectional view of an electrostatic transducer according to a preferred embodiment of the present invention.

FIG. 3 illustrates a cross-section taken along line 3—3 of FIG. 2 of the plurality of transducer cells 200A–C. Each transducer cell 200 is contains an air/vacuum cavity 340 surrounded by an insulative insulating film layer 330, with a bottom electrode 320 and a top electrode 350 associated with each transducer cell 200. Another aspect of the present invention is illustrated in FIG. 3, with reference to the relative dimensions R, S, and D illustrated in FIG. 3. The dimension R is the thickness of the membrane, which is formed of a portion of the insulating layer 330 and the top electrode disposed therein, that is disposed above the air/vacuum cavity 340 and that is required for a certain acoustic impedance of the transducer cells, such impedance governing the frequency range of the transducer.

FIG. 2 illustrates a certain known microfabricated electronic transducer that uses a gold contact layer 14 fabricated on the top surface of the nitride layer 13 as a top electrode of the transducer. The nitride layer 13 illustrated in FIG. 2 and the membrane of the present invention both must operate in the frequency range of interest, as described previously. In contrast to the structure illustrated in FIG. 2, however, the present invention forms the top electrode 350 within the membrane. Accordingly, whereas the separation distance of the bottom and the top electrodes is D in the prior art electronic transducer described in FIG. 2, the separation distance of the bottom and top electrodes according to the present invention is S. Since the top electrode is formed within the membrane, the distance S will, for an otherwise equivalent transducer, always be less than D. By forming the top electrode within the membrane, as described fully hereinafter, parasitic capacitance in the present invention is further reduced.

Another aspect of the present invention illustrated by FIGS. 2 and 3 is that the surface area of the electrodes 320 and 350 is smaller than the surface area of the corresponding air/vacuum cavity 340. As noted hereinafter, this further allows for a reduction in the parasitic capacitance of the resulting ultrasonic transducer.

With the above features of the present invention, it is therefore possible to obtain a microfabricated acoustic transducer capable of operating at frequencies greater than 40 MHz, as well as to operate at lower frequencies with more efficiency. It should be noted that the dimensions and other specifics of the preferred embodiment are provided hereinafter for completeness, but that the present invention can be practiced without those particular dimensions and specifics as provided in the preferred embodiments. That notwithstanding, the transducer cells 200 according to the present invention can have a variety of shapes and dimensions. For example, membrane will typically have an area that ranges from about 300 to 30,000 $\mu m^2$ with a membrane thickness that ranges from about 0.05 to 1 $\mu$m, a residual stress in the PECVD nitride ranging from about 10 to 400 MPa and a gap thickness ranging from about 0.1 to 2 $\mu$m. It is understood, however, that these dimensions are illustrative only and that any dimensions which meet the characteristics of the invention described herein can be used, as previously mentioned.

The process of fabricating an acoustic transducer in accordance with a preferred embodiment of the present invention will now be described with reference to FIGS. 4–15. It will be apparent that various different steps and sequences of steps can be used to fabricate the acoustic transducer according to the present invention.

Figure 4:
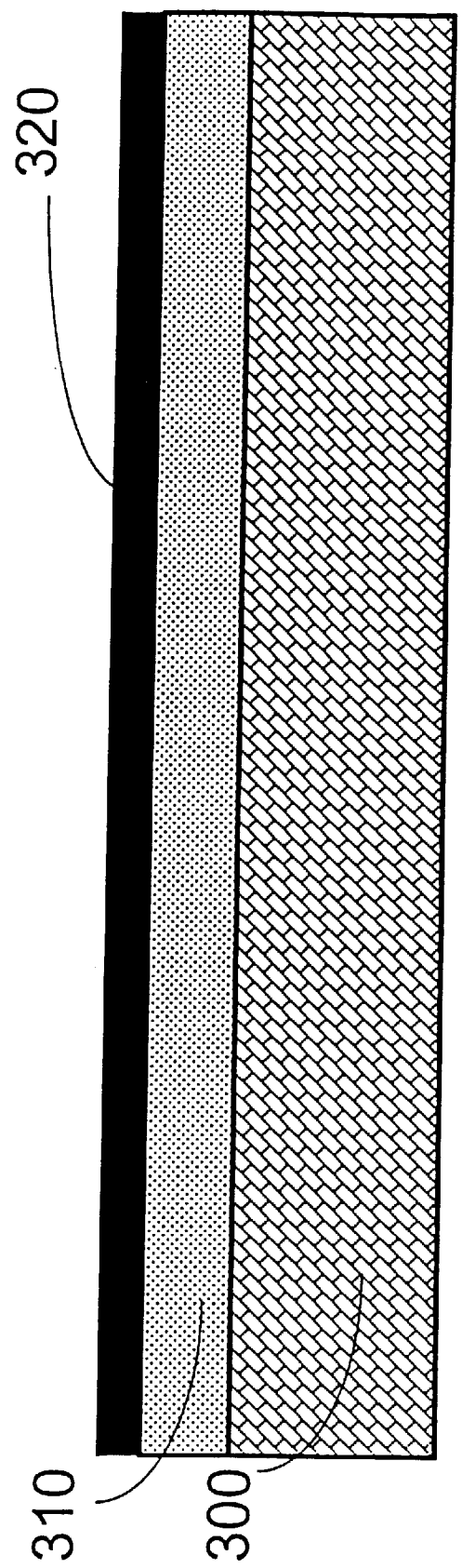
FIGS. 4–15 illustrate a method of fabricating an electrostatic transducer according to a preferred embodiment of the present invention.

Starting with FIG. 4, the process begins with a silicon or other semiconductor support substrate 300. Thereafter, a layer of thermal oxide 310 is grown, preferably having a thickness in the range of 5,000–10,000Å, followed by a deposition of a conductor 320, which may, for example, have a thickness in the range of 2,500–5,000Å. In the preferred embodiment, this conductor is aluminum (Al), but the conductor could also be any conductor known in the art, such as copper (Cu) or tungsten (W) or polysilicon.

Figure 5:
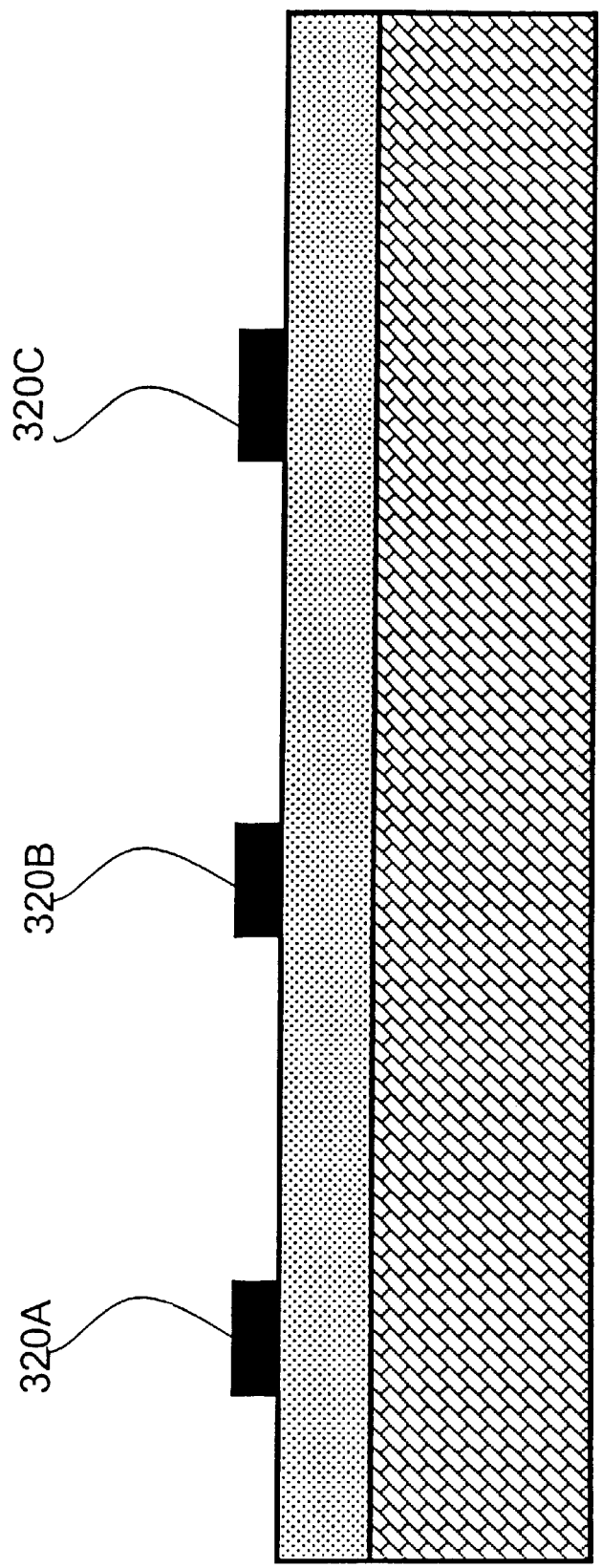

A resist pattern is transferred lithographically to the substrate, and the conductor 320 is etched to leave behind a patterned bottom electrodes 350 and associated interconnects. FIG. 5 illustrates the resultant patterned bottom electrodes 350A–C and FIG. 2 illustrates the resultant patterned bottom interconnect.

Figure 6:
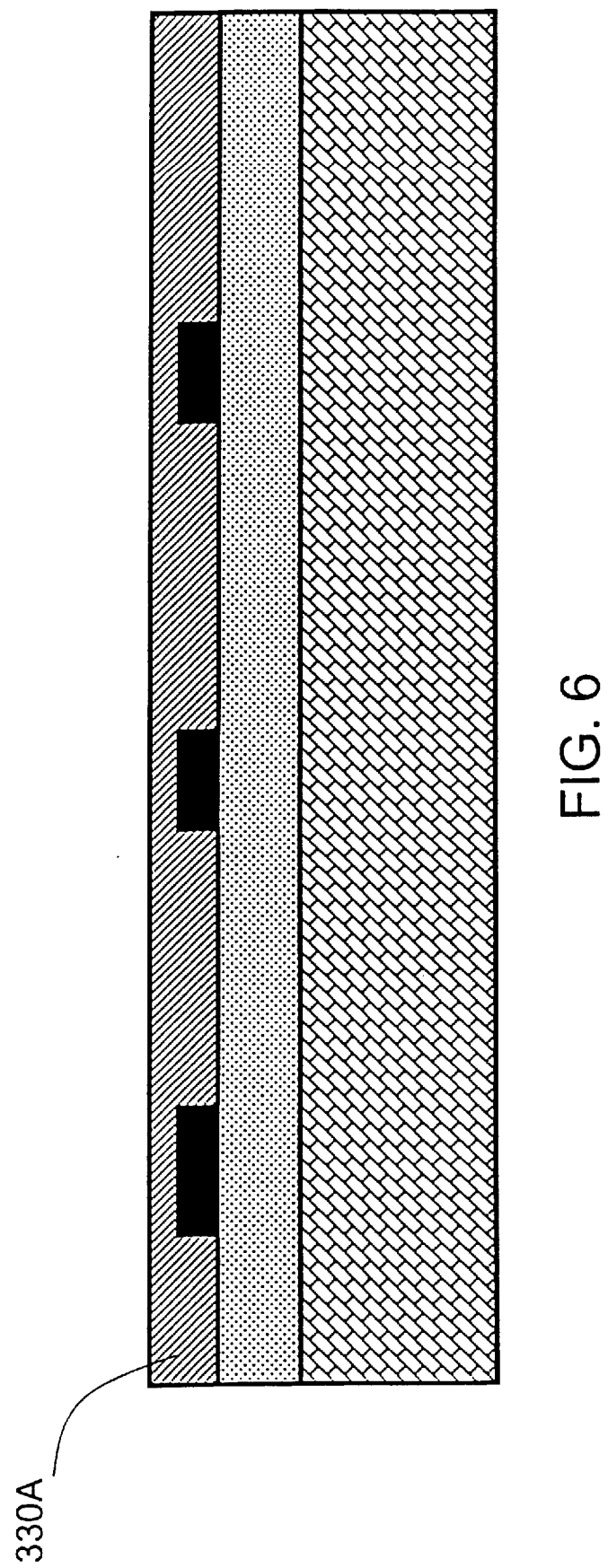

Thereafter, as shown with reference to FIG. 6, a lower insulating film portion 330A of the insulating film 330 is deposited. This lower insulating film portion 330A is an insulator, such as nitride, applied using, for instance a plasma-enhanced chemical vapor deposition (also known as "PECVD"). The applied lower insulating film portion 330A will typically have a measured residual stress that is less than 50 MPas. The residual stress may be adjusted by varying the frequency of the plasma and the relative concentration of nitrogen and silicon carrying gases. The lower insulating film portion 330A will typically be deposited to a thickness of about 0.25 $\mu$m. Further, although illustrated for convenience as being a planarized layer, in fact the deposited lower insulating film portion 330A will typically not be planarized, instead having a substantially even thickness over the various surfaces, so that the contours of the surface to which the lower insulating film portion 330 is applied will continue to perpetuate through the application of subsequently applied layers, as is known in the art. Planarization can be used, but is not necessary and often introduces substantial additional cost and potential for defects. Accordingly, since this phenomenon is well understood, it will not be described further hereinafter.

Figure 7:
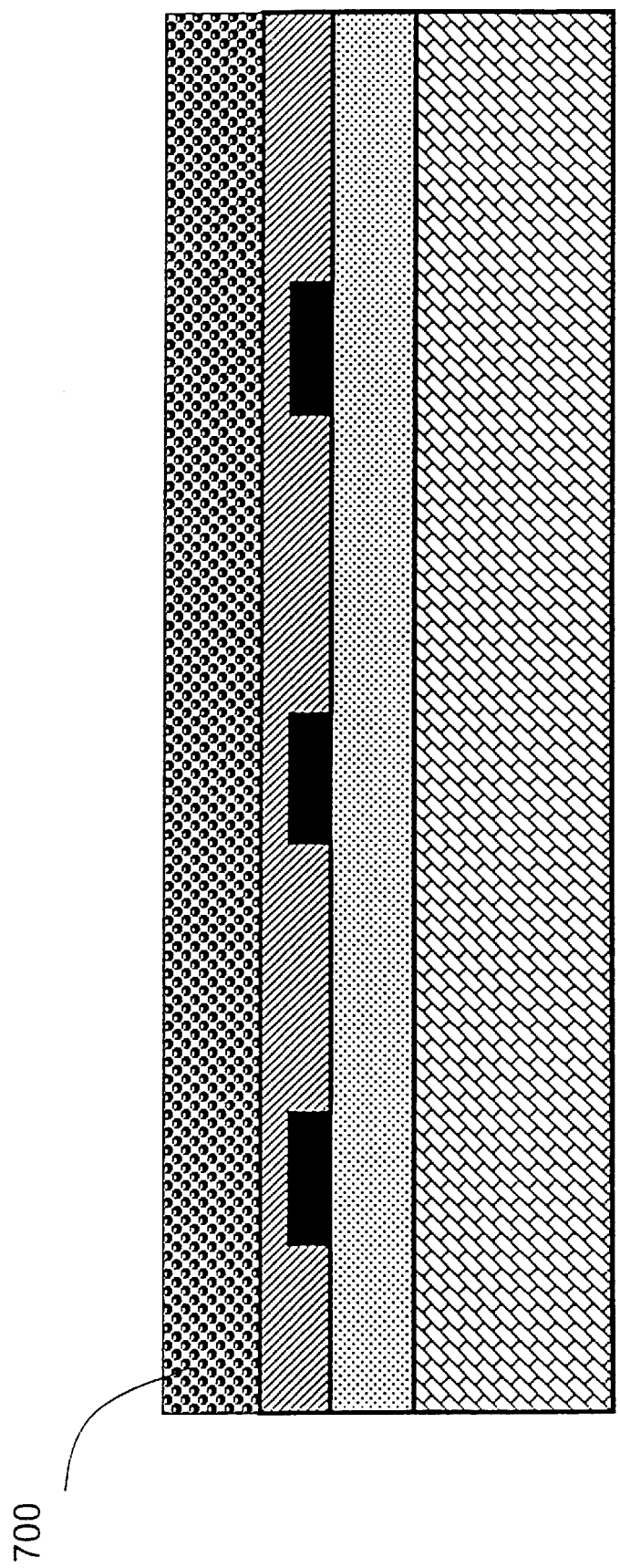
Figure 8:
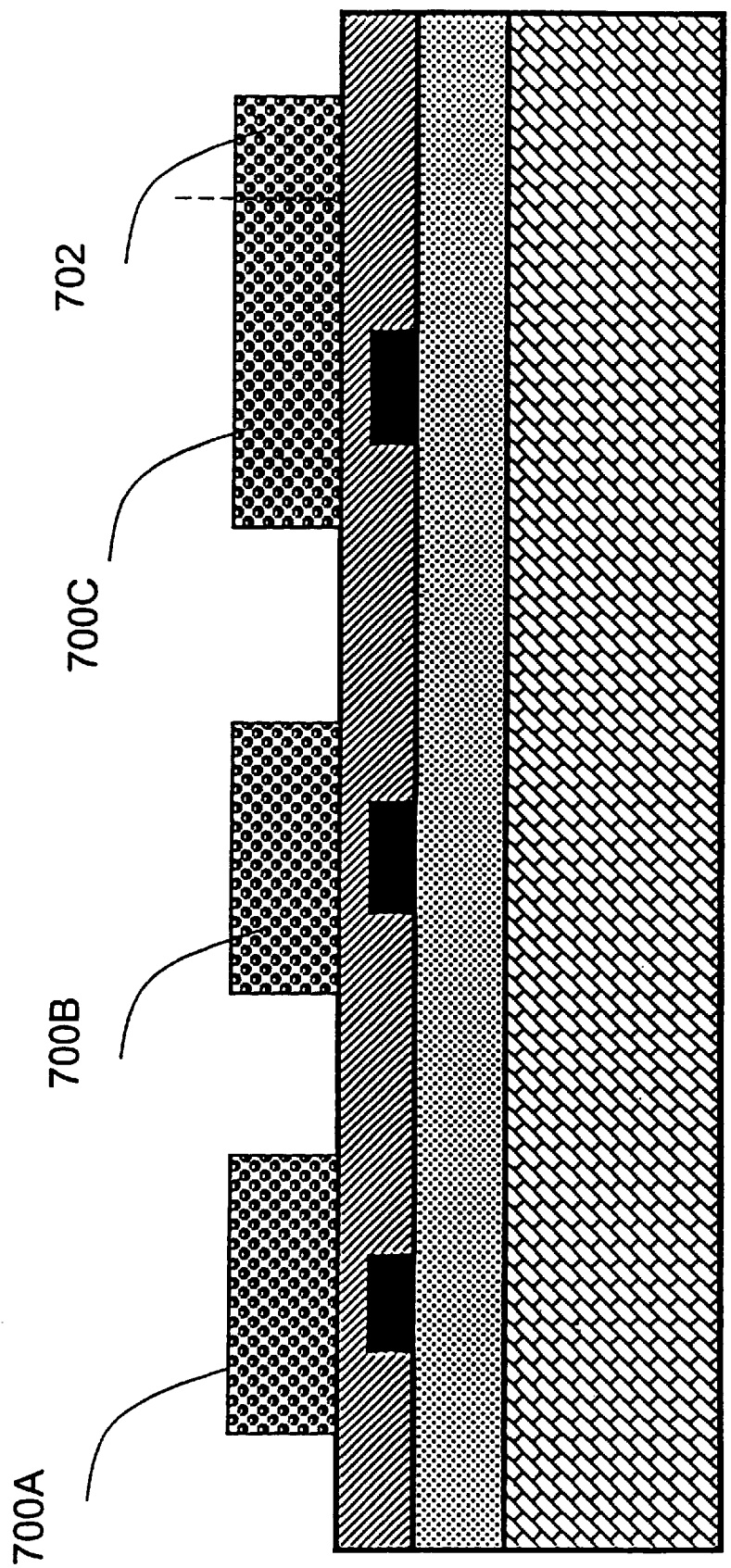

As shown in FIG. 7, a sacrificial layer 700, as known in the art, such as aluminum or low temperature oxide (LTO), is deposited. The deposit thickness may range from 0.05 to 1 $\mu$m. A resist pattern is transferred lithographically, and the sacrificial layer 700 is etched to leave behind a pattern, such as shown in FIG. 8. As illustrated, the sacrificial layer contains portions 700A, 700B and 700C, which will each correspond to a void region that will be made within each transducer cell 200A, 200B and 200C, respectively. Also illustrated is a pathway 702, which pathway 702 will allow for the etchant that removes the sacrificial layer to be introduced from a location that is physically separate from the transducer cells.

Figure 9:
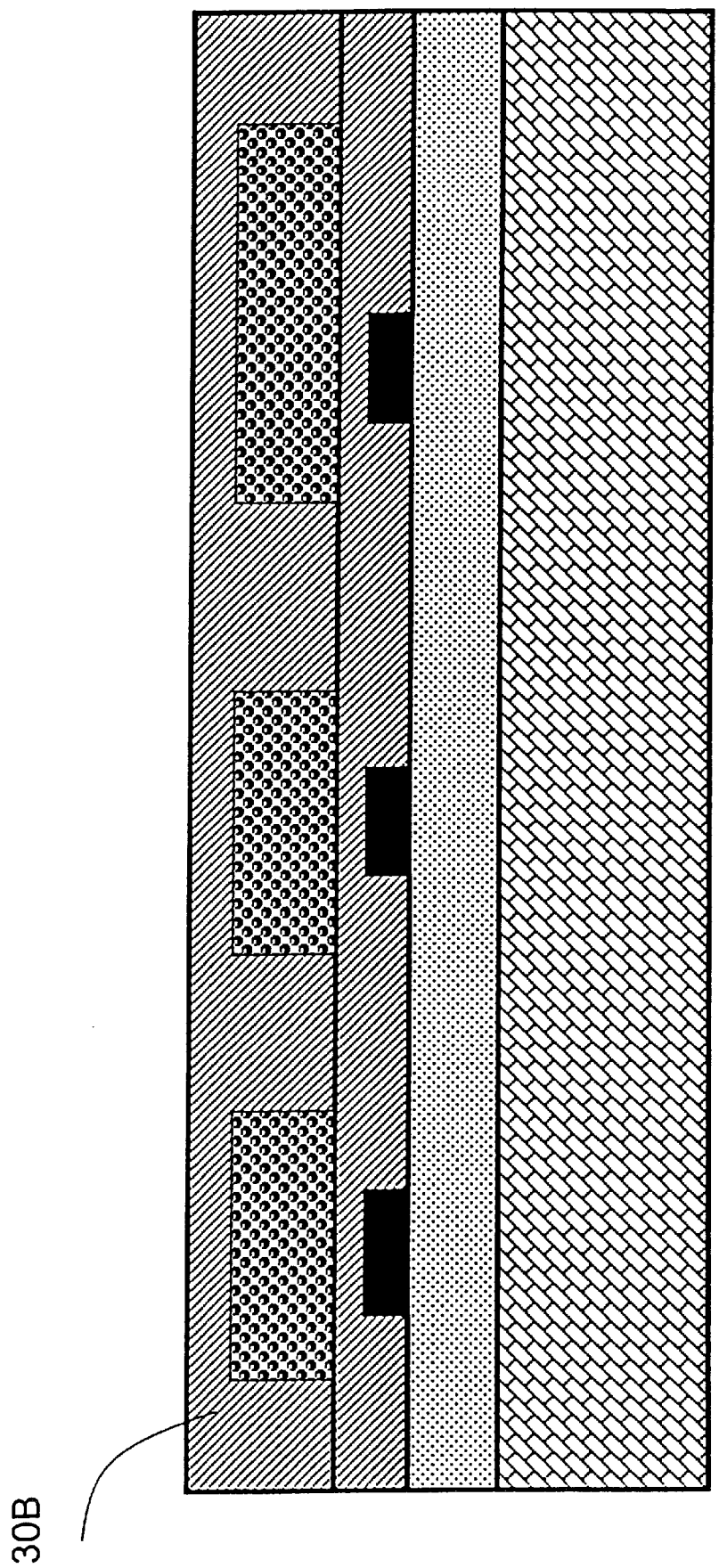

A middle insulating film portion 330B is then deposited, preferably an insulator that is the same as that of the lower insulating film portion 330A. Thus, according to the preferred embodiment, PECVD silicon nitride is deposited as the middle insulating film portion 330B to a thickness of about 0.15 $\mu$m over the patterned sacrificial layer 700 to surround and cover the patterned sacrificial layer 700, as illustrated by FIG. 9.

Figure 10:
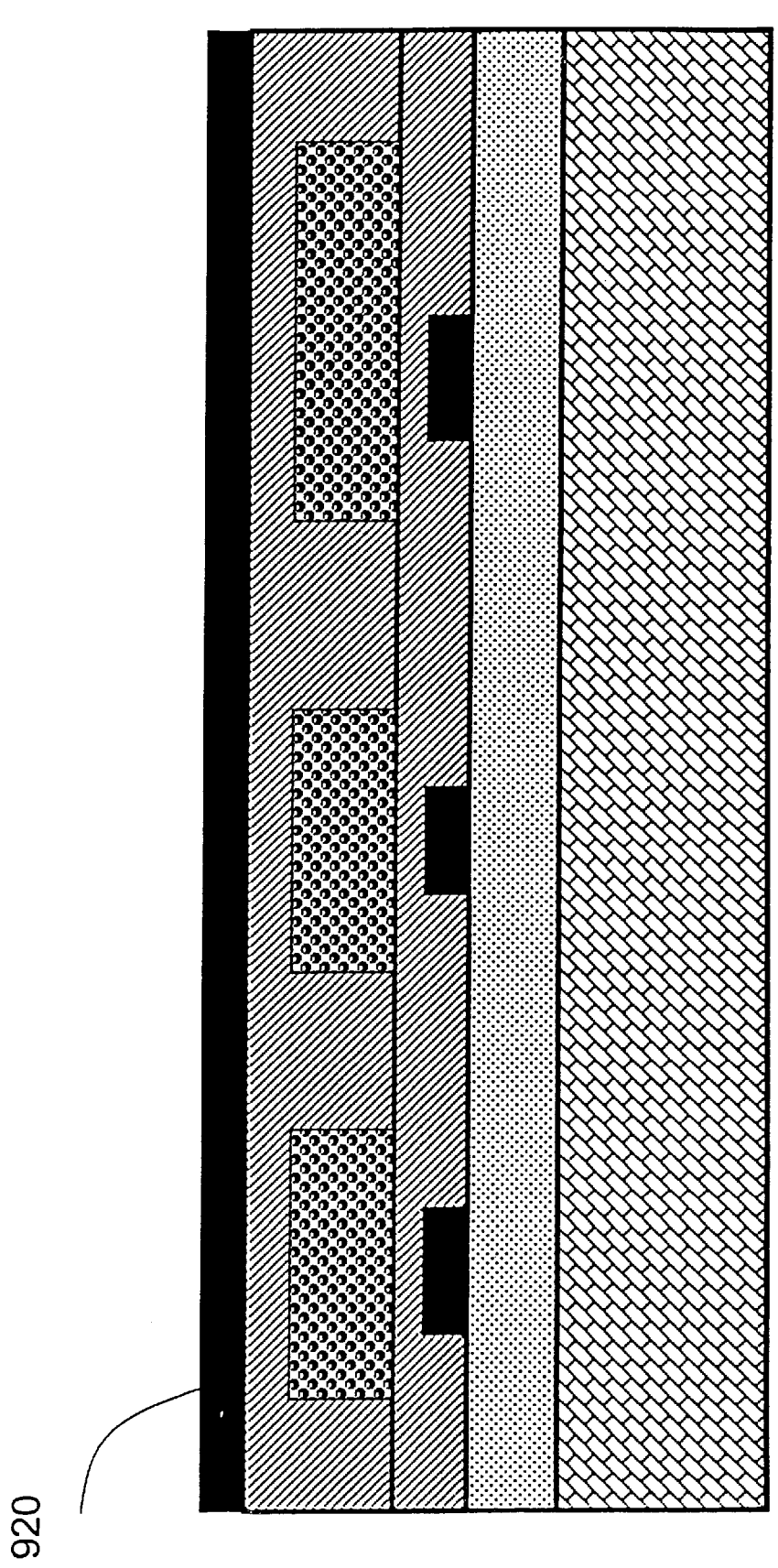
Figure 11:
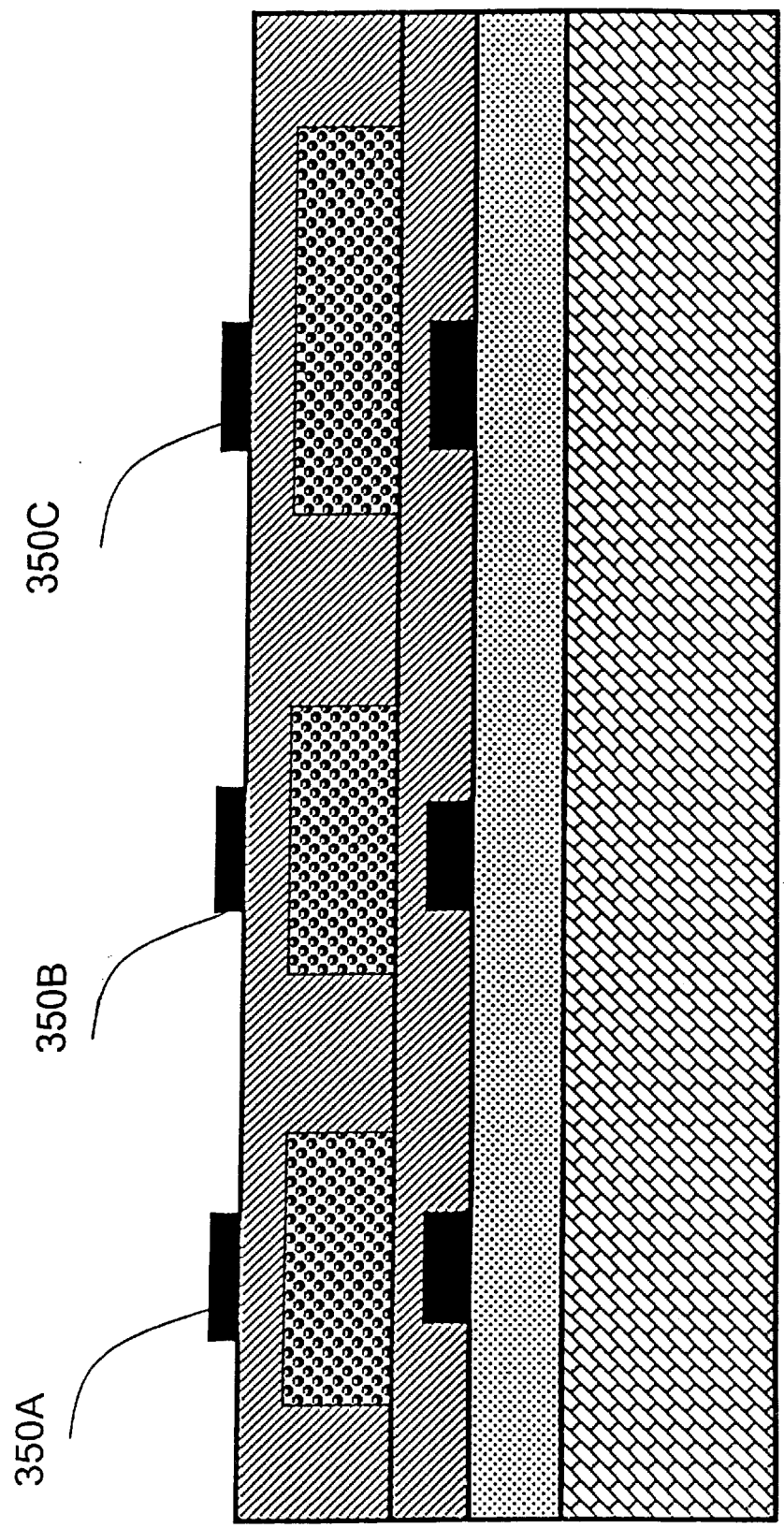

Thereafter, as shown in FIG. 10, the top conductor layer 920 is deposited, and subsequently etched in a pattern to produce a top electrode 350 and the resulting interconnects, as shown in FIGS. 3 and 11 and described previously. Thus, while the electrodes 320A, 320B and 320C will overlap the electrodes 350A, 350B and 350C, respectively, the top interconnects 220 will not overlap with the bottom interconnects 230, as described previously. This is ensured by selection of an appropriate pattern for the top and bottom interconnects, one such pattern being illustrated in FIG. 2.

Figure 12:
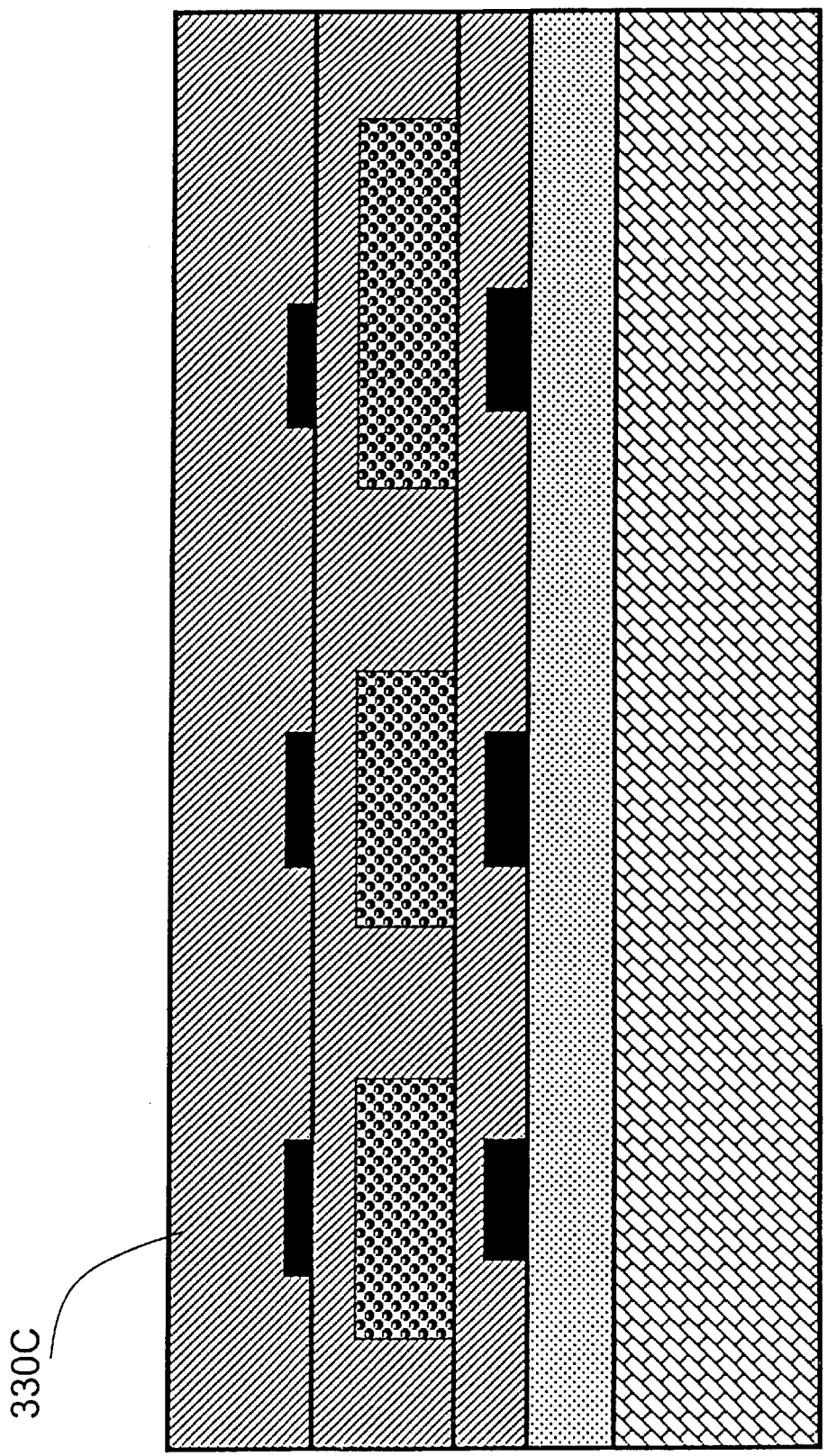

The top insulating film portion 330C of the insulating film 330 is then deposited, as shown in FIG. 12, and the material for the top insulating film portion 330C is preferably the same as that used for the bottom insulating film portion 330A and the middle insulating film portion 330B, previously described.

Figure 13:
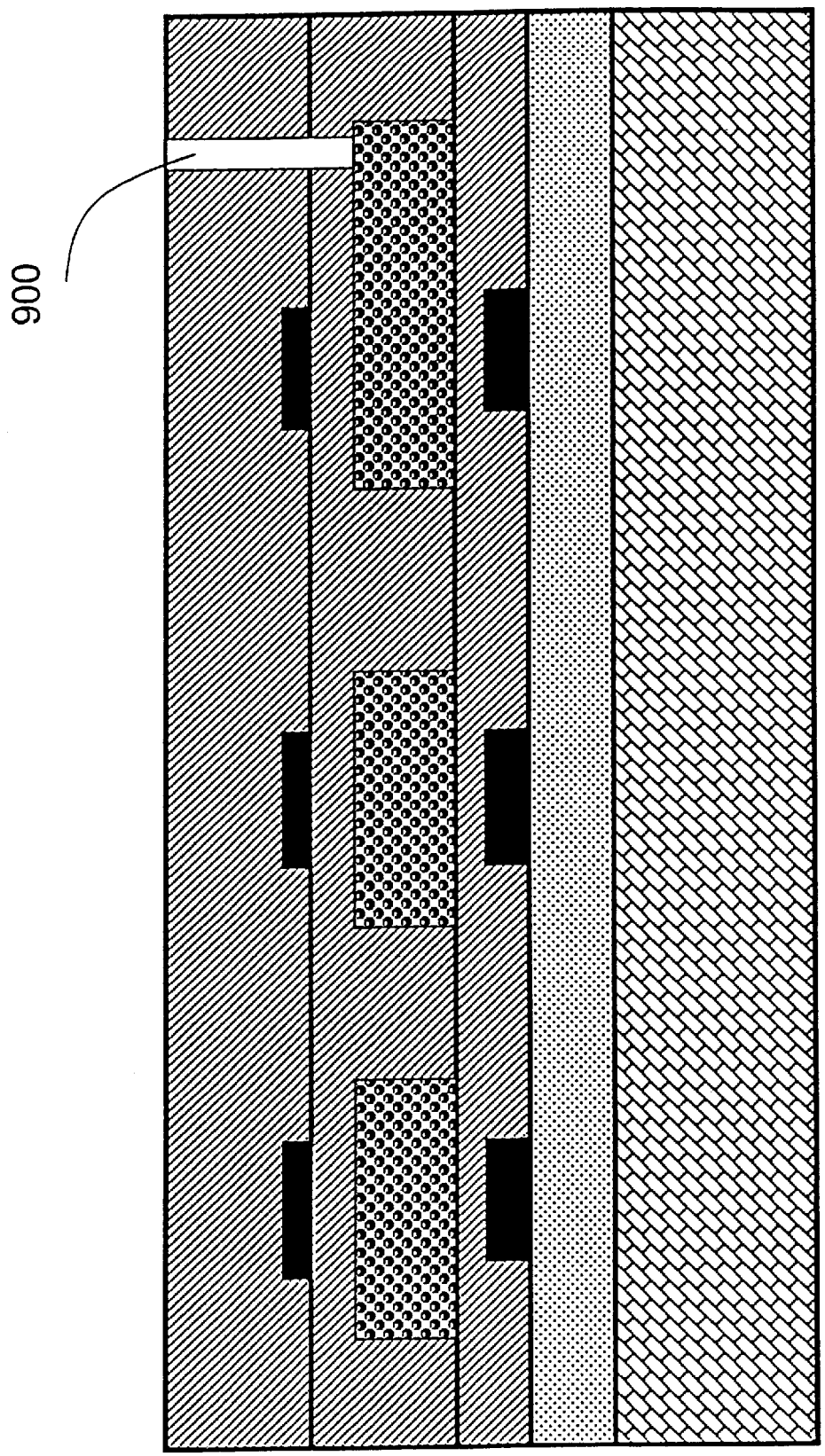
Figure 14:
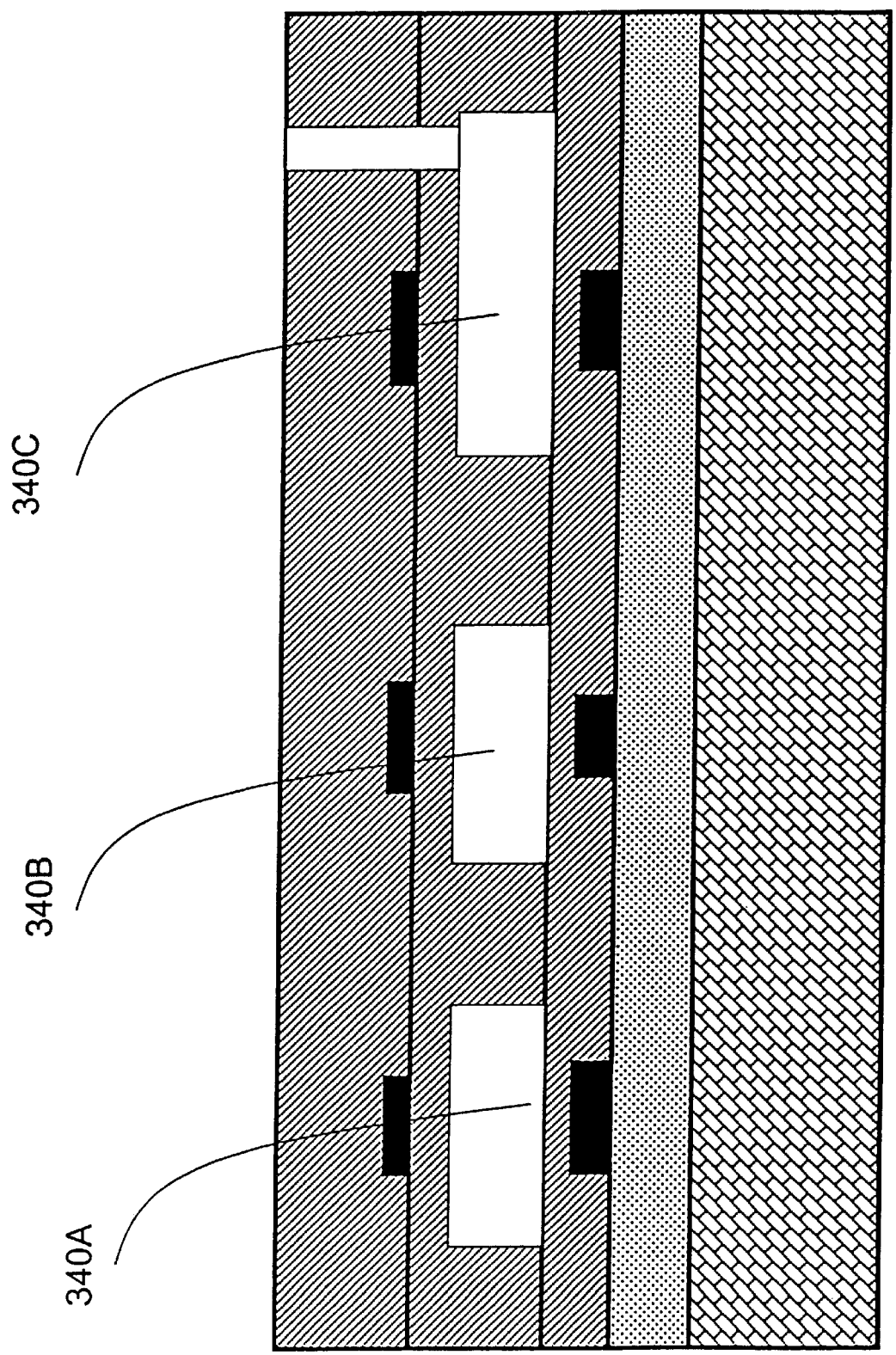
Figure 15:
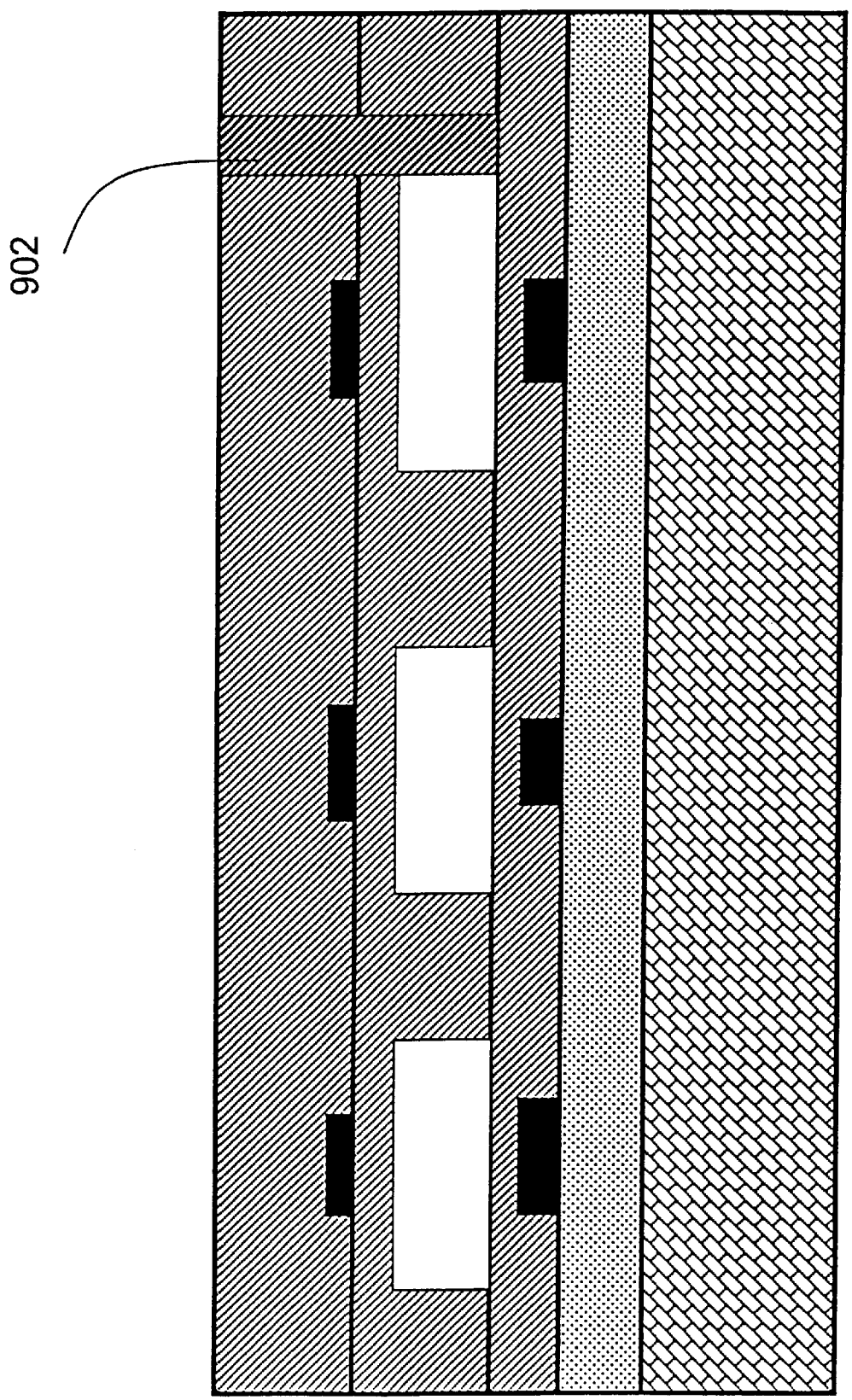

Thereafter, as shown in FIG. 13, using a combination of forming a resist pattern and a suitable plasma etch, via holes 900 are created to provide for an etchant path to the remaining portions of the sacrificial layer, such as portions 700A, 700B, 700C and 702 illustrated in FIG. 8. Accordingly, after the via holes 900 are formed, the remaining portions of the sacrificial layer are then etched away by a sacrificial wet etch or other technique known in the art. For example, buffered hydrofluoric acid can be used in the case of a low temperature oxide (LTO) sacrificial layer 700. The sacrificial etch results in an air/vacuum cavities being formed, such as the cavities 340A, 340B and 340C illustrated in FIG. 14. Thereafter, the via holes 900 can be filled in, preferably using the same material as the insulating film 330, if needed, such as for an immersion transducer. Of course, the additional material added over the top insulating film portion 330C can also become part of the insulating film 330, or it can be subsequently etched from all areas except for the sealing locations.

While the present invention has been described herein with reference to particular embodiments thereof, a latitude of modification, various changes and substitutions are intended in the foregoing disclosure. For example, only certain features and not others of the present invention can be used to reduce parasitic capacitance and still be within the intended scope of the present invention. Also, this invention can be used in devices other than acoustic transducers, such as, for example, a capacitive accelerometer or a capacitive pressure sensor, or other devices that use capacitive behavior in the transducing process. Accordingly, it will be appreciated that in some instances some features of the invention will be employed without a corresponding use of other features without departing from the spirit and scope of the invention as set forth in the appended claims.

I claim:

1. A method of manufacturing a transducer comprising:
   depositing a first conductive layer on a substrate;
   etching the first conductive layer to form at least two first electrodes and a first interconnect electrically connecting the at least two first electrodes;
   depositing a first insulating film layer of insulator material on the etched first conductive layer;
   depositing a sacrificial layer over the first insulating film;
   etching the sacrificial layer to create at least two sacrificial portions, each in substantial alignment with and overlapping one of the two first electrodes;
   depositing a second insulating film layer of insulator material over the etched sacrificial layer;
   depositing a second conductive layer over the second insulating film layer;
   etching the second conductive layer to form at least two second electrodes that overlap and substantially align with the two first electrodes, and a second interconnect electrically connecting the two second electrodes, wherein the second interconnect does not overlap the first interconnect; and
   removing the sacrificial portions to form corresponding void areas.

2. The method of claim 1 further comprising a step of depositing a third insulating film layer of insulator material over the etched second conductive layer.

3. The method of claim 2 wherein the step of removing takes place after the step of depositing the second insulating film layer.

4. The method of claim 2 wherein the step of depositing the sacrificial layer deposits aluminum.

5. The method of claim 1 wherein:
   the step of etching the sacrificial layer further creates a sacrificial pathway connected to the at least two sacrificial portions; and
   the step of removing the sacrificial portions includes the steps of:
      creating a via hole in the second insulating film layer to the sacrificial pathway; and
      etching the sacrificial pathway and the at least two sacrificial portions.

6. The method of claim 1 wherein the steps of depositing the first and second conductive layers deposit aluminum.

7. The method of claim 6 wherein the step of depositing the sacrificial layer deposits aluminum.

8. The method of claim 1 wherein the steps of depositing the first and second conductive layers deposit copper.

9. The method of claim 1 wherein the steps of depositing the first and second conductive layers deposit tungsten.

10. The method of claim 1 wherein the steps of depositing the first and second insulating film layers deposit silicon nitride using plasma-enhanced chemical vapor deposition.

11. The method of claim 1 wherein the step of depositing the sacrificial layer deposits a low temperature oxide.

12. The method of claim 1 wherein the step of etching the sacrificial layer creates the at least two sacrificial portions such that each sacrificial portion has a surface area that is larger than the corresponding first electrode.

13. The method of claim 1 further comprising simultaneously forming a plurality of transducers in an array.

* * * * *